May 29, 1956 F. KRESS 2,747,640
APPARATUS FOR MAINTAINING A PREDETERMINED
PRESSURE IN THE TIRE OF A VEHICLE
Filed Aug. 7, 1951 5 Sheets-Sheet 1

INVENTOR:
Fritz Kress
By:
Michael S. Striker
agt.

INVENTOR:
Fritz Kress
By:
Michael S. Struker
Agt.

May 29, 1956  F. KRESS  2,747,640
APPARATUS FOR MAINTAINING A PREDETERMINED
PRESSURE IN THE TIRE OF A VEHICLE
Filed Aug. 7, 1951  5 Sheets-Sheet 5

INVENTOR:
Fritz Kress
By:
Michael S. Striker

United States Patent Office 2,747,640
Patented May 29, 1956

2,747,640

APPARATUS FOR MAINTAINING A PREDETERMINED PRESSURE IN THE TIRE OF A VEHICLE

Fritz Kress, Wolfenbuttel, Germany

Application August 7, 1951, Serial No. 240,644

Claims priority, application Germany August 10, 1950

12 Claims. (Cl. 152—417)

The present invention relates to an apparatus for maintaining a predetermined pressure in the tire of the wheel of a vehicle. This apparatus may be fully automatic.

One of the objects of the present invention is to provide an apparatus for automatically maintaining a predetermined pressure in the tire of any of the several wheels of a vehicle.

Another object of the present invention is to provide a means for observing pressure in the tire of any of the several wheels of a vehicle.

A further object of the present invention is to provide an apparatus for automatically maintaining a predetermined pressure in the tire of any of the several wheels of a vehicle, either while the vehicle is moving or while it is stationary.

An additional object of the present invention is to render the observation and control of the tire pressure in any of the wheels of a vehicle convenient for the operator of the vehicle.

A still further object of the present invention is to provide a device of the above type in which the parts will have an extremely long life due to the small wear thereof.

With the above objects in view the present invention mainly consists of an apparatus for maintaining a predetermined pressure in the tire of a vehicle, the said apparatus involving increasing pressure in the tire when the pressure thereof goes below a predetermined level and decreasing the pressure of the tire when the pressure thereof exceeds a predetermined level. This increase and decrease may be fully automatic. The apparatus of the present invention includes a first housing portion mounted on the wheel of the vehicle and having a chamber communicating with the tire and a second housing portion mounted on the axle of the vehicle and mating with the first housing portion. One of these housing portions is rotatable with respect to the other of the housing portions. A valve means is mounted in the chamber of the first housing portion to control the flow of air to and from the same, and control means are mounted in the second housing portion for movement toward and away from the valve means so as to open the latter only when air must be added or removed from the chamber and tire. This control means may be operated by electromagnetic devices, and the latter may in turn be operated by switches which are operatively connected to pressure control devices communicating with the chamber of the first housing portion so that changes in pressure in said chamber operate the pressure control devices to in turn operate the switches and the electromagnetic devices to thereby cause the valve means to be operated so as to add or remove air from the chamber and tire.

In known devices for observing and controlling the air pressure in the tire of a vehicle, there is a great wear in the parts of the devices because of the connection of the same with the moving parts of the vehicle. The present invention overcomes this drawback by connecting the pressure control means with the moving wheel of the vehicle only when air must be added or removed from the tire of the vehicle. Moreover, in such known devices, the control of the pressure either is not automatic or is inconvenient and defective. The present invention also overcomes these latter drawbacks by providing a fully automatic apparatus for observing and controlling the pressure in the tire of a vehicle, and this apparatus is extremely efficient in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
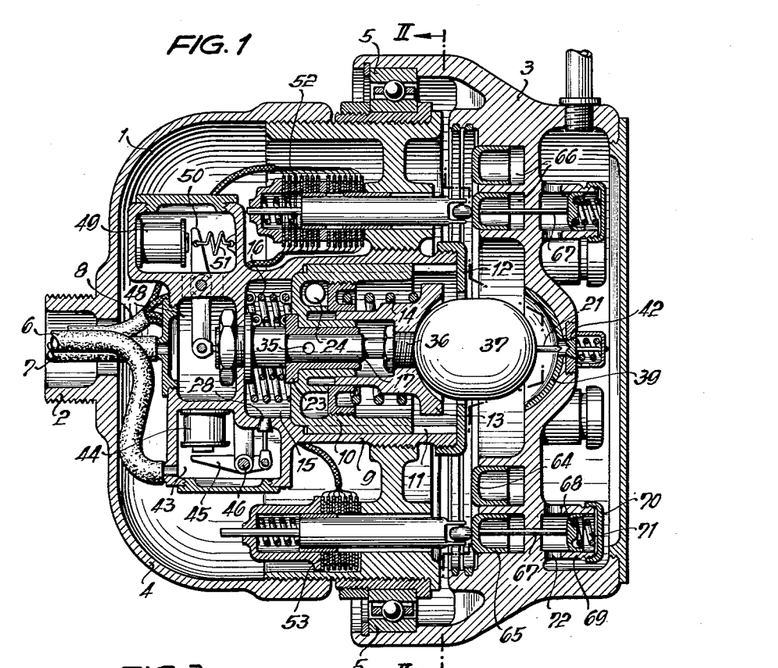
Fig. 1 shows a sectional view taken along line I—I of Fig. 2 in the direction of the arrows and showing one possible apparatus for carrying out the present invention.

Referring to the drawings, there is shown in Fig. 1 a housing 1 having two housing portions, 3 and 4, which mate with each other and are rotatably mounted with respect to each other through the medium of the ball bearing 5. The housing portion 3 is rotatably mounted with respect to housing portion 4. The axle in which the housing portion 4 is mounted is bored to receive the same, and the housing portion 3 is mounted on the wheel to rotate therewith and with respect to the housing portion 4. Where the wheel and axle rotate together, which is the case in the drive wheels of the vehicle, the housing portion 3 is mounted on the wheel to rotate therewith and with the axle, and the housing portion 4 is mounted in the axle so that the latter rotates with respect to the housing portion 4, and in this way the housing portion 4 would remain stationary with respect to the rotating housing portion 3.

The particular structure shown in Fig. 1 is one in which the wheel rotates with respect to the axle, and the axle is bored both to receive the housing portion 4 and to support lines 6, 7 and 8 leading to the housing portion 4. Line 6 is a tube, which may be flexible, for leading compressed air to the tire, and this tube 6 communicates with a source of compressed air such as a compressed air tank (not shown) which is mounted on the vehicle. The tube 7 communicates with a pressure indicator so as to give an indication of the pressure in the tire, and the cable 8 leads electrically conductive wires to various parts of the device, as explained below. In the particular example illustrated in Fig. 1 the housing portion 4 is mounted in the axle by means of the threading 2. The cable 8 leads to the housing portion 4 from the dashboard of the vehicle.

The stationary housing portion 4 is provided with an axially extending cylinder 9 and a piston 10 mounted for movement therein. The wall of cylinder 9 is formed with a groove 11 in which a projecting part of piston 10 slidably moves so as to prevent the piston 10 from rotating about its axis. Mounted on the cylinder 9 is a limiting ring 12 which limits the movement of the piston 13 which is mounted for movement on the piston 10, as shown in Fig. 1. Spring 14 is mounted between the pistons 10 and 13, and the piston 13 has a cylindrical skirt portion mounted for sliding movement on a central part of the piston 10 so that the piston 13 is guided in its movement by this central portion of the piston 10.

Space 15 is formed in the cylinder 9 ahead of the piston 10, and this space 15 is of a smaller diameter than the piston 10 so that the latter in its position of rest, shown in Fig. 1, cannot extend into the space 15. In this space 15 there is located the spring 16 which is connected at one end thereof to an end wall of cylinder 9 and at the other end thereof to the piston 10 so as to urge the latter toward its rest position when the apparatus is not actuated.

Figure 10:
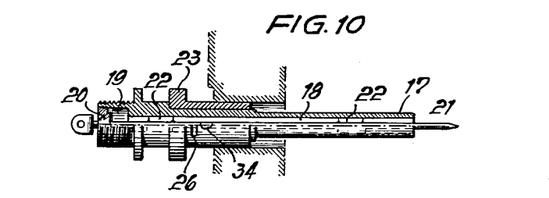
Fig. 10 is a partially sectional view of the structure of Fig. 9 in one position thereof.

Along the axis of cylinder 9 there is located an elongated rigid conduit 17 formed with an elongated bore 18 and having an enlarged bore portion 19 located at the left end thereof, as viewed in Fig. 10. The conduit 17 is threadedly mounted on the left end wall of cylinder 9, as viewed in Fig. 1, and this conduit 17 serves as a central guide for the piston 10. The enlarged bore portion 19 of conduit 17 serves to mount the conical valve means 20 which is united with an elongated, valve operating, needle member 21 which is of lesser diameter than the bore 18 of conduit 17. The elongated member 21 is formed with fins 22 which engage the surface of bore 18 so as to guide the elongated member 21 within the conduit 17 for movement along the axis thereof.

Figure 3:
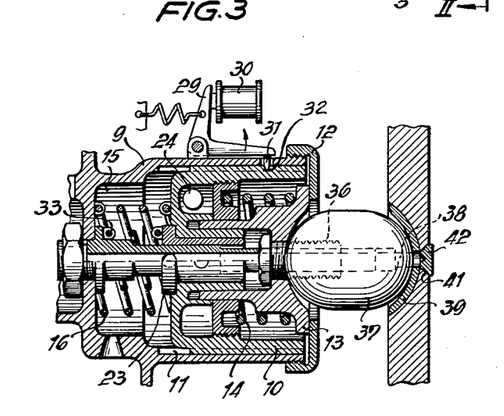
Fig. 3 shows a part of the structure of Fig. 1 in a different position thereof.
Figure 4:
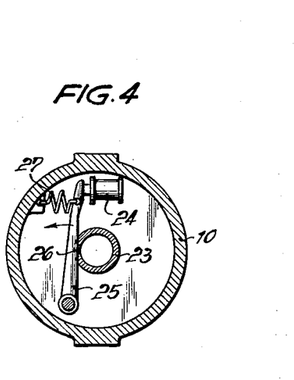
Fig. 4 is a partially sectional view taken along line IV—IV of Fig. 5 in the direction of the arrows.
Figure 11:
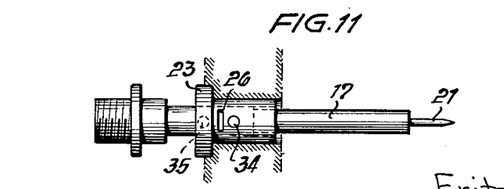
Fig. 11 is a view of the structure of Fig. 9 in another position thereof.

Slidably mounted upon the conduit 17 is the sleeve member 23, which has a groove 26 formed in the wall thereof and extending transversely to the axis thereof, as shown in Figs. 4 and 11. Mounted in the piston 10 for movement therewith is an electromagnet 24 which has associated therewith a one-armed lever 25 which is pivotally mounted at an end thereof distant from electromagnet 24 and which has the other end thereof urged away from electromagnet 24 by spring 27, as shown in Fig. 4. A spring 33 is connected at one end thereof to the left end portion of conduit 17, as viewed in Fig. 3, and at the opposite end thereof, to the sleeve 23 to urge the latter toward the left end wall of cylinder 9, as viewed in Fig. 1, and this spring 33 is located within the spring 16.

The air-tight chamber 43 is mounted adjacent to the space 15 of cylinder 9 and the valve means 28 is located between this space 15 and chamber 43 for controlling the flow of air from chamber 43 to space 15. Tube 6 leads to the chamber 43, as is apparent from Fig. 1, so that air under pressure is supplied to space 15 when the valve means 28 is open. This valve means 28 is operated by the double-armed lever 45 which is pivotally mounted at 46 and which is operated by the electromagnet 44 so as to be opened when the electromagnet 44 is energized. Spring 47 (Fig. 5) urges the valve 28 into its closed position and is connected at one end thereof to a wall portion of the chamber 43 and at the other end thereof to an end portion of the lever 45 which is distant from the valve means 28.

When the valve means 28 is open and air under pressure is admitted to space 15, this air under pressure will move the piston 10 to the position shown in Fig. 3. During this movement, the electromagnet 30 (Fig. 3) is energized so as to urge the bell crank 29 against the action of the spring connected thereto in a clockwise direction, as viewed in Fig. 3. The bell crank 29 does not reach its final position, however, until the projection 31 mounted thereon engages the recess 32 in the wall of piston 10 (Figs. 3 and 5), and this engagement of the recess 32 and projection 31 serves to hold the piston 10 in the operating position illustrated in Fig. 3 as long as the electromagnet 30 is energized and after the valve means 28 is closed.

When the parts of the device are in the position illustrated in Fig. 1 and the valve means 28 is opened, the electromagnet 24 may be energized so that the lever 25 engages the groove 26 in sleeve 23 (Fig. 4), and as the piston 10 moves from its rest position shown in Fig. 1 to its operating position shown in Fig. 3, the engagement between lever 25 and groove 26 will cause the sleeve 23 to move with the piston 10. When the latter is located in the operating position shown in Fig. 3, the electromagnet 24 is de-energized so that the spring 27 moves the lever 25 out of the groove 26 (Fig. 4), and the spring 33 then draws the sleeve 23 back to its position of rest.

Figure 9:
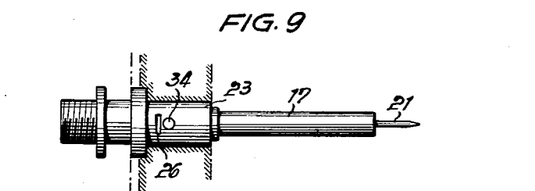
Fig. 9 is a view of another part of the structure of Fig. 1.

As is apparent from Figs. 1 and 11, the conduit 17 has the bore 35 passing through the wall thereof. The sleeve 23 has a bore 34 passing through the wall thereof, as shown in Figs. 9–11, and when the parts are in the position shown in Fig. 1, that is in their position of rest, both of the bores 34 and 35 are aligned and covered by the central portion of piston 10 which guides the piston 13. The parts are then in a position which is diagrammatically illustrated in Fig. 9. When the piston 10 moves under the influence of the air pressure in the space 15 and carries the sleeve 23 therewith, as was explained above, the bore 34 moves away from the bore 35, and the sleeve 23 covers the bore 35, as is illustrated in Fig. 11. When electromagnet 24 is de-energized and spring 33 moves sleeve 23 back to its original position, while piston 10 remains in its operating position shown in Fig. 3, the bore 34 again becomes aligned with the bore 35, as illustrated in Fig. 10, and the air in the space 15 can then pass through these bores to the bore 18 of conduit 17.

The spring-pressed piston 13 has rotatably and coaxially mounted thereon the elongated tubular member 36 which is slidably mounted with respect to the conduit 17 and which is threaded on its outer surface at the part thereof located to the right of piston 13, as is shown in Fig. 3. Fixedly mounted on the member 36 by means of the threads thereof is the movable pressure member 37 which is in the form of a somewhat eliptical member and which is transversely bored at 38 along its axis and coaxially with the pistons 10 and 13. The members 36 and 37 are therefore free to rotate with respect to the piston 13 and conduit 17 while being maintained in coaxial relation thereto, and members 17 and 37 form a single adjustable conduit means. The left end of the member 37 engages a spherical recess in the piston 13, and the elongated needle member 21 extends through and beyond the conduit 17 and through the bore 38 of the pressure member 37, as is apparent from Fig. 1.

Figure 5:
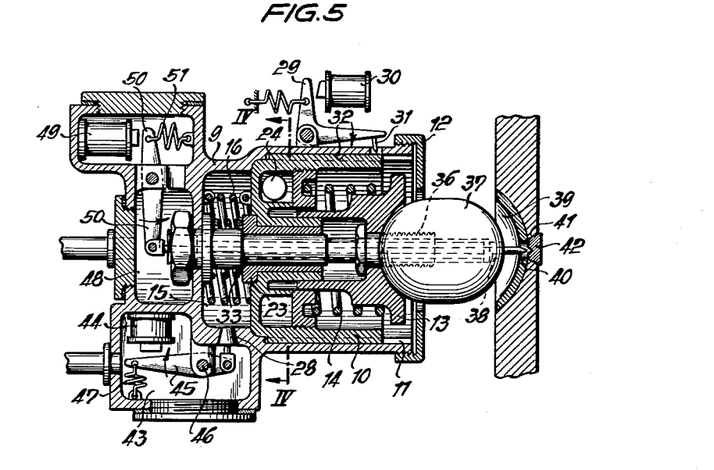
Fig. 5 is a view of a part of the structure of Fig. 1 on a somewhat enlarged scale.

When the piston 10 is in the operating position illustrated in Fig. 3, the right end of the pressure member 37 engages a spherical cut-out portion 39 of the rotating housing portion 3, and the bore 38 of pressure member 37 thereby communicates with the passage 40 formed with the conical seat 41 for the conical valve means 42, as shown in Figs. 3 and 5. When the pressure member 37 is in the operating position shown in Fig. 3, and contacts the portion 39 of housing portion 3, the pressure member 37 is set into rotation and rotates with respect to the piston 13 as a result of the above-described mounting of member 36 upon which pressure member 37 is mounted, this member 36 rotating with the pressure member 37 and with respect to the piston 13 and conduit 17. The pressure member 37 thus forms a movable conduit portion which engages and communicates with the valve means 42 only when the parts are in the operating position shown in Fig. 3 so that there is no wear on the parts when the device is not actually adding or removing air from a tire. The valve member 42 may be automatically opened against the action of the spring urging the same into its closed position, as shown in Fig. 1, by the action of the air pressure against the same when the valve means 28 is open, or the valve means 42 may be opened by the needle member 21 when the latter is moved to the right, as viewed in Figs. 1 and 9–11, and when the valve means 28 is opened.

The air-tight chamber 48 is located on the other side of the left end wall of cylinder 9 from the space 15, and the tube 7 communicates with this chamber 48 to afford an indication of the air pressure in the tire. The electromagnet 49 is mounted in the chamber 48 and the two-armed lever 50 which is pivoted at an intermediate part thereof is urged at its upper end, as viewed in Fig. 1, away from the electromagnet 49 by the spring 51 which is fixed at one end to a part of the chamber 48 and at its other end to the lever 50. The lower end of lever 50, as viewed in Fig. 1, is pivotally connected to the valve means 20 (Fig. 10) and thereby to the needle member 21, so that when the electromagnet 49 is energized the needle member 21 and valve means 20 will be moved to the right, as viewed in Fig. 1, and thereby open the valve means 42.

The operation of the above-described apparatus is as follows:

When it is desired to add air to a tire, the electromagnet 44 is energized so as to open the valve means 28, and the air under pressure flows through the tube 6 to the chamber 43 and through the open valve means 28 to the space 15. This air under pressure moves the piston 10 and the sleeve 23 therewith, as explained above, to the position illustrated in Fig. 3, where the bore 38 of the pressure member 37 communicates with the passage 40 and the valve means 42. This valve means 42 controls the flow of air to the enlarged air-tight chamber formed in the housing portion 3, as shown in the right-hand side of Fig. 1, and this chamber communicates with the interior of the tire through the tube shown at the top right-hand part of Fig. 1. Thus, when the parts are in the position shown in Fig. 3 and the valve means 28 is open, and when the sleeve 23 has been moved away from the piston 10 so that the bores 34 and 35 are in alignment with each other, as shown in Fig. 10, the air under pressure will flow through the bore 38 and will automatically open the valve means 42 against the action of its spring so as to supply air to the air-tight chamber of housing portion 3 and thereby increase the air pressure in the tire.

When it is desired to reduce the air pressure in the tire because this pressure has exceeded a predetermined limit, for example, only the electromagnet 49 is energized, with the parts in the position shown in Fig. 1, so that the needle member 21 moves to the right and opens the valve 22 to permit air to escape from the tire and out through the ball bearing 5 to the atmosphere.

When it is desired to observe the pressure in the tire, the electromagnet 44 is energized so as to open the valve means 28 and admit air under pressure to the space 15 so that the piston 10 is moved to the position shown in Fig. 3. When this position is reached, the electromagnet 44 is de-energized so as to close the valve means 28, and the piston 10 is maintained in its operating position by the projection 31 of bell crank 29, this projection 31 engaging the recess 32 so as to maintain the piston 10 in its operating position. The electromagnet 49 is then energized so that the valve means 20 is opened and so that the needle member 21 opens the valve means 42. In this way, air flows from the air-tight chamber of housing 3 through the bore 38 of the movable conduit 37 and through the conduit 17 to the chamber 48 so that this air may communicate with the tube 7 and with a pressure gauge connected thereto to indicate the pressure in the tire.

The above-described apparatus may be operated either manually or automatically. In order to operate the same manually it is only necessary to provide separate switches for energizing solenoids 44, 49 and 30. The structure described below is adapted to operate these solenoids automatically.

Figure 7:
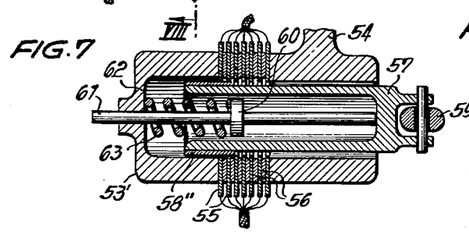
Fig. 7 is a view on an enlarged scale of another part of the structure of Fig. 1.
Figure 8:
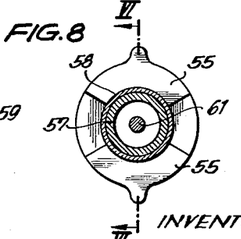
Fig. 8 is a partially sectional view taken along line VIII—VIII of Fig. 6 in the direction of the arrows.

In the stationary housing portion 4 there are located adjacent to the cylinder 9, the switch means 52 which controls the adding of air to the tire, and the switch means 53 for permitting air to be released from the tire. The structure of these switches is shown on an enlarged scale in Figs. 6–8. The above switch means comprise several electrically conductive plates 55 which are insulated from each other by plates 56 which are non-conductive and located between the metal plates 55. The switch means 52 includes two sets of plates 55, each set including pairs of plates located opposite to and separated from each other, as is apparent from Fig. 8. The switch means 53 is of the same construction except that only one set of these pairs of plates 55 is included therein. The plates 55 of switch means 52 are mounted on the cylindrical body 52', and the plates 55 of switch means 53 are mounted on the cylindrical body 53', these cylindrical bodies 52' and 53' being fixedly mounted in the housing portion 4. In each cylinder body 52' and 53' there is located a piston 57 which is provided with an electrically conductive ring. The piston 57 associated with the switch means 52 includes two such rings 58 and 58' which respectively engage the two sets of plates 55, and the piston 57 associated with the switch means 53 includes a single electrically conductive ring 58" which engages the plates 55 thereof. These rings make sliding contact with the insulated plates 55. In the interior of each of the pistons 57 there is located the elongated member 61 which has a shoulder 60 formed thereon, and this shoulder 60 engages the spring 63 which bears against an end wall of the cylindrical body 52' or 53' so as to urge the pistons 57 to the right, as viewed in Figs. 6 and 7. Rotatably mounted on the right-hand end of each piston 57 is a roller 59, as shown in Figs. 6 and 7.

Figure 2:
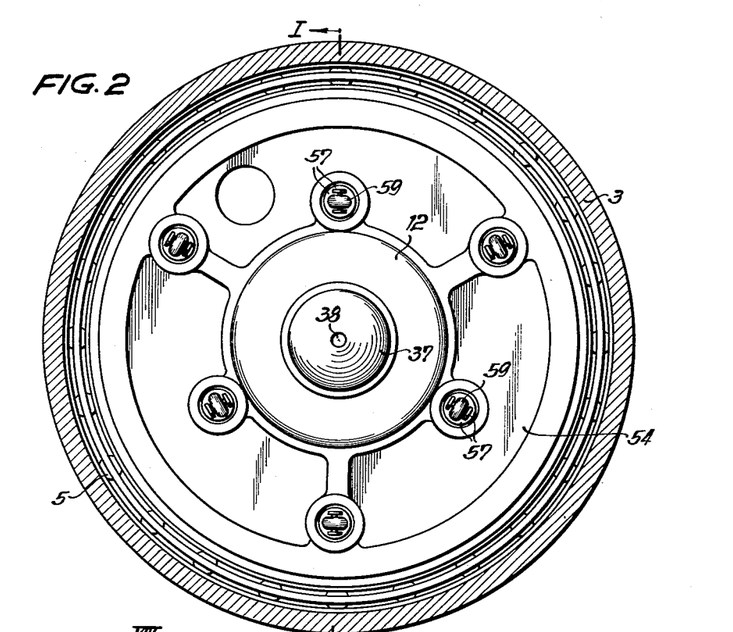
Fig. 2 is a partially sectional view taken on line II—II of Fig. 1 in the direction of the arrows.
Figure 6:
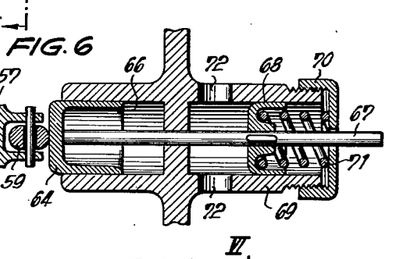
Fig. 6 is a view of a part of the structure of Fig. 1 on an enlarged scale and taken along line VI—VI of Fig. 8 in the direction of the arrows.

As is shown in Figs. 1 and 6, the rotating housing portion 3 is formed with two concentric annular grooves 66 in which the annular rings 64 and 65 are respectively mounted for movement in a direction parallel to the axis of rotation of the housing portion 3. These ring members 64 and 65 engage the rollers 59, and, as is apparent from Fig. 2, the switch means 52 comprises three inner rollers 59 which engage the ring 64 while the switch means 53 comprises three outer rollers 59 which engage the ring 65. Each of these rings is connected to three pins 67 which are located 120° apart from each other and which pass through a wall of the air-tight chamber formed in the rotating housing portion 3. Fixedly connected to the end portion of each pin 67 which is located in this air-tight chamber is the piston member 68 which is mounted for movement in the cylindrical housing portion 69 formed with the bores 72 which communicate with the air-tight chamber of the rotating housing portion 3. Each of these cylindrical housings 69 has a cover 70 and between the piston 68 and cover 70 is located the spring 71 which urges the rings 64 or 65 to the left, as viewed in Figs. 1 and 6. Thus, whenever there is a drop in pressure in the air-tight chamber of housing portion 3 which communicates with the tire, the springs 71 will move the rings 58, 58' and 58" to the left so that the latter contact the appropriate plates 55 to automatically energize the appropriate electromagnets, as will be described below. On the other hand, if the pressure in the tire and air-tight chamber of housing portion 3 should increase beyond a predetermined limit, this air pressure will compress the springs 71 so that the springs 63 will move the rings 58, 58' and 58" to the right, as viewed in Figs. 1 and 6, and thereby cause the appropriate plates 55 to be contacted so as to energize the appropriate electromagnets for decreasing the pressure in the tire, as will be explained below.

Figure 14:
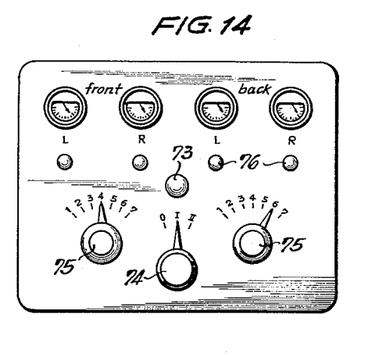
Fig. 14 is a diagrammatic view of instruments located on the dashboard of a vehicle and used in the present invention.

In Fig. 14 there are shown a plurality of instruments mounted on the dashboard of the vehicle for indicating the condition of the pressure in the tires of the vehicle and for controlling the same. These instruments include pressure gauges for the left and right front wheels and left and right rear wheels, respectively, and associated with each of these pressure gauges is a lamp 76 which lights up when the pressure associated with a lamp 76 has fallen below a predetermined level. The lamp 73, when it is illuminated, shows that the automatic apparatus is operating. The main switch 74 sets the apparatus either for automatic operation, for measuring the pressure of the air in the tires, or for disconnecting the apparatus, and the structure is so constructed that the automatic adding of air pressure to the tires will not be interfered with by the setting of the parts for measuring the air pressure in the tires, as will be explained below. Two switches 75 are provided, one for the front wheels and one for the rear wheels, for setting the desired air pressure in the same, in accordance with any suitable graduations such as those shown in Fig. 14.

Figure 12:
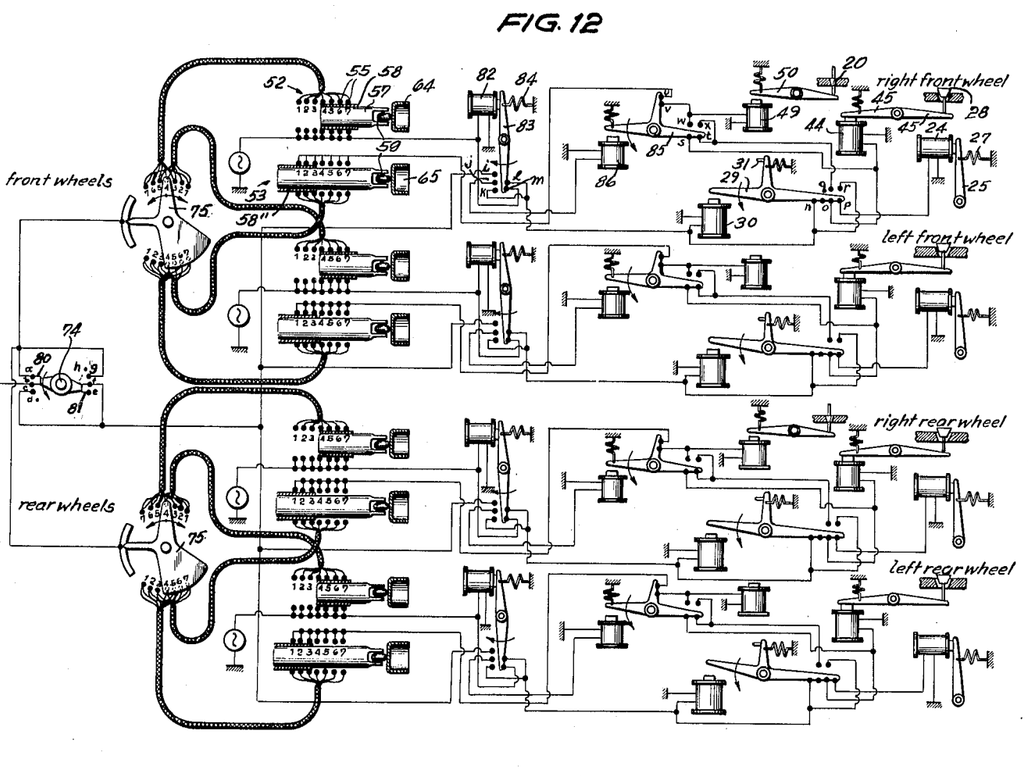
Fig. 12 is a wiring diagram of the electrical control means for almost all of the apparatus of the invention.

Referring to Fig. 12, it is seen that the main switch 74 comprises two U-shaped electrically conductive members 80 and 81 which are insulated from each other and which are adapted to be moved between three positions and make contact with the various contacts $a$—$h$. The current is supplied from any suitable source, such as a battery, to the contact $b$. The switches 75 each includes a movable member which at one end thereof makes contact with only one of the desired pressure points 1—7, and which at the other end thereof, the lower end as viewed in Fig. 12, makes contact with the desired pressure point and all the remaining pressure points above the same. Although Fig. 12 illustrates the separate wiring connections for each of the wheels, only the wiring for the right forward wheel shown at the top of Fig. 12 will be described below since the wiring connections for the other wheels are identical.

As an example, it is assumed that it is desired to automatically maintain the pressure at that value corresponding to the number 4 setting of the switch 75, as shown in Fig. 12, that the pressure in the tire has fallen below this point, and that the switch 74 is located in the automatic operative position where the member 80 interconnects points $a$ and $b$ and where the member 81 interconnects points $e$ and $f$, as shown in Fig. 12. Only the right-hand set of plates 55 and the contact ring 58 of switch means 52, as viewed in Fig. 6, is shown in Fig. 12, and the switch means 53 is also shown in Fig. 12. Since the pressure in the tire is below the point 4, in accordance with the above assumption, the contact ring 58 will interconnect the two plates 55 which correspond to the fourth position of the switch 75, and the ring 58" does not contact the points 4—7. The current from the battery flows to the point $b$, through the member 80 to the point $a$, and from the latter to both of the switches 75. The current therefore flows through the point 4 at the upper end of switch 75 and through the contact plates 55 corresponding to point 4 and ring 58 of the switch means 52. The current does not flow through the switch means 53 because the ring 58" thereof does not contact the points 4, and therefore the points 4—7 of the lower part of switch 75 have no current flowing through them at this time. It is apparent that as the pressure in the tire is increased, the ring 58 will pass the plates of point 4 and break the circuit between the same so as to prevent the addition of too much air to the tire, and if the pressure in the tire should increase beyond the point 4 level, the ring 58" will contact the plates of point 4 and cause the pressure in the tire to be released, as will be explained below.

The current on passing through the plates of point 4 of switch means 52 flows through the electromagnet 82 to attract the pivotally mounted double-armd lever 83 against the action of spring 84 and thereby electrically interconnect the contacts $l$ and $m$. In this way the current flows from the contact $m$ to the contact $l$ and to the electromagnet 30 so as to energize the same, but this electromagnet 30 will be unable to move the bell crank lever 29 because the projection 31 does not yet engage the recess 32 of piston 10, as explained above. The current therefore flows to the contact $n$ and from there to the contacts $o$ and $p$. From the contact $o$ the current flows to the solenoid 44 so as to energize the same and admit air to the space 15 so as to move the piston 10, and from the contact $p$ the current flows to the solenoid 24 so that it attracts the arm 25 to thereby maintain the sleeve 23 fixed with respect to the piston 10 so that the sleeve 23 moves with the piston 10, as explained above. When the projection 31 engages the recess 32 of piston 10, the bell crank lever 29 moves into engagement with the electromagnet 30 so that the circuit to the points $n$, $o$ and $p$ is broken, and so that the points $q$ and $r$ are electrically interconnected with each other. The breaking of the circuit through the points $n$, $o$ and $p$ causes the breaking of the circuit of the electromagnet 24 so that the spring 27 may retract the arm 25 and thereby permit the sleeve 23 to move to its original position under the action of the spring 33. The current then flows beyond the solenoid 30 which is still energized to the points $r$ and $q$ and to the points $t$ and $s$ so as to maintain the circuit through the solenoid 44 and thereby maintain the valve means 28 open until the air pressure in the tire increases sufficiently for the ring 58 to pass beyond the point 4 and break the electrical circuit, at which time all of the parts automatically return to their position of rest. It will be noted that the lamp 76, associated with the right front wheel wiring described above, is illuminated as long as the ring 58 interconnects the two plates 55 at the point 4 of the switch means 52, and that this lamp becomes extinguished as soon as the circuit between these plates is broken, so that the lamp 76 indicates when the pressure has fallen below the predetermined level.

Assuming now that the air pressure has been thus automatically set at the value corresponding to point 4, and for some reason, such as overheating of the tires, the pressure has increased beyond the predetermined level, the operation of the parts is as follows:

The increase in pressure will move the rings 58 and 58" to the right, as viewed in Fig. 12, so that there will be no electrical current passing through the switch means 52. However, the increase in pressure will cause the ring 58" to contact the points 4 and also the points 5, 6 and 7 if the pressure has increased that much, and it will be noted that the lower part of switch 75, as viewed in Fig. 12, provides electrical current to all of the points above and including the desired level of the pressure. Assuming that the ring 58" has contacted the pressure points 4, the current will then flow through the switch 75, the switch 74 remaining in the automatic position illustrated in Fig. 12, through the plates of point 4 of the switch means 53 and directly to the contact $u$ which is electrically connected to the contact $v$ by the bell crank lever 85 associated with the electromagnet 86. From the contact $v$ the current will flow to the electromagnet 49 so as to energize the same, and this will cause the valve 20 and the valve needle 21 to be moved to the right, as viewed in Fig. 1, so as to open the valve means 42 and release air pressure from the tire, as was explained above, until the ring 58" has moved to the left, as viewed in Fig. 12, and broken the circuit between plates 55 of the point 4 of the switch means 53. In this way the pressure in the tires is automatically maintained at a predetermined level.

Assuming now that it is desired to simply take a reading of the pressure in the tires, the main switch 74 is moved so that the member 80 thereof electrically interconnects the contacts $b$ and $c$, and so that the contact 81 thereof electrically interconnects the contacts $f$ and $g$. The current will then flow from the contact $b$ to the contact $c$ and from the latter to the contacts $f$ and $g$ so that a voltage is applied to the switch 75 in the event that the pressure in the tire changes so as to cause the automatic apparatus described above to commence to operate. In this way the automatic regulation of the pressure will continue during the taking of the reading of a pressure. The current from the point $c$ also flows to the point $i$ which is connected by arm 83 to the points $j$ and $k$. The current from the point $j$ flows through the solenoid 86 to energize the same, and thereby break the connection between contacts $u$ and $v$, and $s$ and $t$, and to make an electrical contact between the points $w$ and $x$. The current also flows from the point $k$ to the electromagnet 30 to energize the same, and, as was explained above, the bell crank 29 cannot move toward the electromagnet 30 because the projection 31 is not yet in the recess 32. The current therefore flows through the contacts $n$ and $o$ to the electromagnet 44 to open the valve means 28 and permit the air pressure to move the piston 10 to the position shown in Fig. 3, and the current also flows from the point $p$ to the electromagnet 24 to hold the arm 25 in the groove 26 of sleeve 23, for the purpose described above. As soon as the projection 31 enters the recess 32, the electromagnet 24 is de-energized and the bell crank 29 moves to interconnect the points $q$ and $r$ so that the current then flows to the points $x$ and $w$ which are interconnected due to the energizing of electromagnet 86, and in this way the electromagnet 49 is energized so as to open the valve 20 and move the needle member 21 to open the valve means 42. It will be noted that when the bell crank 29 moves to the electromagnet 30 as a result of the projection 31 entering the recess 32, the circuit to the electromagnet 44 is broken, and the valve means 28 thereby closes simultaneously with the energizing of the electromagnet 49. The air from the tire then passes through the chamber 48 and tube 7 so that a reading of the pressure thereof may be taken upon the appropriate gauge of the dashboard.

After the reading is taken, the switch 74 may be moved back into the automatic position shown in Fig. 12, or it may be moved to the opposite position where the member 80 bridges contacts $c$ and $d$ and where the member 81 bridges members $g$ and $h$, the latter position being the position where the device is disconnected.

Figure 13:
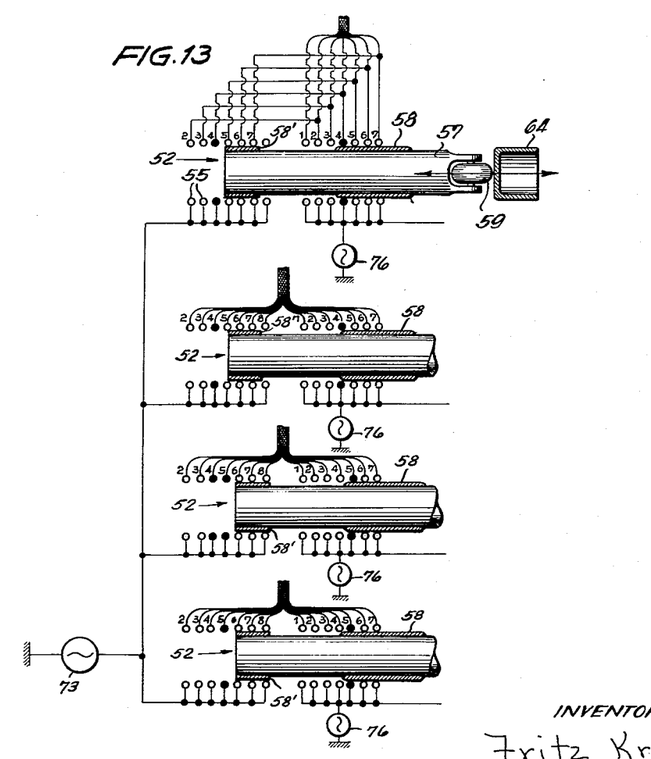
Fig. 13 shows a wiring diagram for a part of the structure of the present invention.

As was mentioned above, the lamp 73 indicates when the automatic device is operated. The electrical connections for this lamp are illustrated in Fig. 13. Ring 58' of switch means 52 cooperates with the left set of contact plates shown in Fig. 6 for controlling lamp 73. Assuming that the switch 75 is set for the pressure corresponding to point 4, it will be seen that the top portion of Fig. 13 indicates the position where the pressure has just increased sufficiently to shift ring 58' to break the contact to the light 73 and to extinguish the same, while the right-hand contact ring 58 of the switch means 52 is still in contact with the point 4 but has left the contact 3. When the pressure was slightly below that indicated in the top part of Fig. 13, the lamp 73 was illuminated. The portion next to the top part of Fig. 13 indicates when the pressure has reached equilibrium and just increased sufficiently to permit the contact ring 58 of the switch means 52 to break the electrical circuit between plates 55 at point 4 of the right-hand set of plates of switch means 52. The next to the lowermost portion of Fig. 13 shows the parts in the position corresponding to the topmost portion of Fig. 13 but where the switch 75 has been set for pressure point 5, and the lowermost part of Fig. 13 is the same as the next to the lowermost part thereof. These two lowermost parts correspond to the two rear wheels, for example, and the two uppermost parts of Fig. 13 correspond to the two forward wheels of a vehicle, for example.

It will be understood that each of the elements described above, or two or more together, may also find a useful application in other types of process and apparatus for automatically regulating the pressure in the tire of a vehicle differing from the types described above.

While the invention has been illustrated and described as embodied in a process and apparatus for observing and automatically regulating the air pressure in the tire of a vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for maintaining a given air pressure in the tire of a vehicle, comprising in combination, a first housing portion; a second housing portion mating with said first housing portion and being rotatably mounted with respect thereto; valve means mounted in one of said housing portions; first duct means located in the other of said housing portions and being mounted for movement between a first position where it is out of communication with said valve means and a second position where it is in communication with said valve means; second duct means leading to said first duct means for feeding compressed air thereto; and operating means mounted in said other of said housing portions and being located adjacent to said valve means for operating the same, said operating means comprising an elongated member having a free end located opposite said valve means and being mounted for movement along its axis and lever means connected to said elongated member for moving the same.

2. An arrangement for maintaining a given air pressure in the tire of a vehicle, comprising in combination, a first housing portion; a second housing portion mating with said first housing portion and being rotatably mounted with respect thereto; valve means mounted in one of said housing portions; first duct means located in the other of said housing portions and being mounted for movement between a first position where it is out of communication with said valve means and a second position where it is in communication with said valve means; second duct means leading to said first duct means for feeding compressed air thereto; and operating means mounted in said other of said housing portions and being located adjacent to said valve means for operating the same, said operating means comprising an elongated member having a free end located opposite said valve means and being mounted for movement along its axis, lever means connected to said elongated member for moving the same, and electromagnetic means operatively connected to said lever means for controlling the same.

3. An arrangement for maintaining a predetermined air pressure in the tire of a vehicle, comprising in combination, a first housing portion; a second housing portion mating with said first housing portion and being mounted for movement with respect thereto; a first chamber located in one of said housing portions; first valve means mounted in said one of said housing portions and communicating with said first chamber for controlling the flow of air to and from the same; a cylinder formed in the other of said housing portions, said cylinder being located opposite to said first valve means and having its axis aligned therewith; a second chamber located in said other of said housing portions; second valve means located between said second chamber and said cylinder for controlling the flow of air therebetween; a third chamber located in said other of said housing portions; third valve means; air supply means communicating with said second chamber for supplying air thereto; a piston mounted in said cylinder for movement between an operating position where said piston is located adjacent to said first valve means and a rest position where said piston is located distant from said first valve means; elongated conduit means extending through said piston and communicating at one end thereof with said first valve means only when said piston is in said operating position thereof, said conduit means communicating at the opposite end thereof with said third valve means and said conduit means being formed with a bore passing through the wall thereof and being covered by said piston when the latter is in its rest position and being uncovered when said piston is in said operating position thereof; and duct means leading from said third chamber.

4. An arrangement for maintaining a predetermined air pressure in the tire of a vehicle, comprising in combination, a first housing portion; a second housing portion mating with said first housing portion and being mounted for movement with respect thereto; a first chamber located in said one of said housing portions; first valve means mounted in said one of said housing portions and communicating with said first chamber for controlling the flow of air to and from the same; a cylinder formed in the other of said housing portions, said cylinder being located opposite to said first valve means and having its axis aligned therewith; a second chamber located in said other of said housing portions; second valve means located between said second chamber and said cylinder for controlling the flow of air therebetween; a third chamber located in said other of said housing portions; third valve means; air supply means communicating with said second chamber for supplying air thereto; a piston mounted in said cylinder for movement between an operating position where said piston is located adjacent to said first valve means and a rest position where said piston is located distant from said first valve means; elongated conduit means extending through said piston and communicating at one end thereof with said first valve means only when said piston is in said operating position thereof, said conduit means communicating at the opposite end thereof with said third valve means and said conduit means being formed with a bore passing through the wall thereof and being covered by said piston when the latter is in its rest position and being uncovered when said piston is in said operating position thereof; duct means leading from said third chamber; and elongated needle means extending through and beyond said conduit means for controlling said first valve means, said needle means being connected to said third valve means for movement therewith.

5. An arrangement for maintaining a predetermined pressure in the tire of a vehicle, comprising a combination, a first housing portion; a second housing portion mating with said first housing portion, one of said housing portions being rotatable with respect to the other of said housing portions; a first chamber located in said first housing portion; first valve means communicating with said first chamber for controlling the flow of air to and from the same; a cylinder formed in said second housing portion and located opposite said first valve means; a second chamber located in said second housing portion; second valve means located between said second chamber and said cylinder for controlling the flow of air therebetween; a piston mounted for movement in said cylinder between an operating position where said piston is located adjacent to said first valve means and a rest position where said piston is located distant from said first valve means, said cylinder having a space located ahead of said piston in said rest position thereof and communicating with said second valve means; and conduit means mounted on said piston for movement therewith and communicating with said first valve means when said piston is in said operating position thereof, whereby, when said second valve means is open and air under pressure is admitted to said second chamber, said air flows to said space ahead of said piston in said cylinder to move said piston to said operating position thereof and then said air flows through said conduit means and said first valve means to said first chamber.

6. An arrangement for maintaining a given air pressure in the tire of a vehicle, comprising, in combination, a first rotatable housing part formed in the interior thereof with a chamber and being formed at its axis of rotation with a bore communicating with the interior of said chamber; valve means mounted in said chamber over said bore for closing and opening the same; a second housing part connected to said first housing part; a pressure member movably mounted in said second housing part for movement between a first position where said pressure member is located against said first housing part opposite said bore thereof, and a second position, where said pressure member is located away from and out of contact with said first housing part, said pressure member being formed with an opening passing therethrough and communicating with said bore of said chamber of said first housing part when said pressure member is in said first position thereof; spring means operatively connected to said valve means in said chamber for urging said valve means into the closed position thereof; moving means operatively connected to said pressure member for moving the same between said positions thereof; and fluid supply means communicating with said opening of said pressure member to supply fluid to the same, whereby, when said pressure member is moved to said first position thereof by said moving means and fluid is supplied to said opening of said pressure member by said fluid supply means, the fluid opens said valve means against the action of said spring means to supply fluid to said chamber.

7. An arrangement for maintaining a given air pressure in the tire of a vehicle, comprising, in combination, a first rotatable housing formed in the interior thereof with a chamber, and being formed at its axis of rotation with a bore communicating with the interior of said chamber; valve means mounted in said chamber over said bore for closing and opening the same; a second housing part connected to said first housing part; a pressure member movably mounted in said second housing part for movement between a first position, where said pressure member is located against said first housing part opposite said bore thereof, and a second position, where said pressure member is located away from and out of contact with said first housing part, said pressure member being formed with an opening passing therethrough and communicating with said bore of said chamber of said first housing part when said pressure member is in said first position thereof; moving means operatively connected to said pressure member for moving the same between said positions thereof; an elongated valve operating member mounted in said pressure member for movement in said opening thereof to open and close said valve means when said pressure member is in said first position thereof; and operating means connected to said valve operating member for moving the same, said operating means being independent of the pressure of the fluid in said chamber of said first housing part.

8. An arrangement as defined in claim 7 and wherein a conduit means is operatively connected to said pressure member for carrying a fluid to and from said opening thereof, and second and third valve means associated with said conduit for controlling the flow of fluid thereto.

9. An arrangement as defined in claim 8 and wherein an electromagnet means is associated with said second and third valve means for operating the same.

10. An arrangement as defined in claim 9 and wherein an adjustable switch means is operatively connected to said electromagnet means for energizing and deenergizing the latter, and a movable pressure-sensitive means communicating with the interior of said chamber of said first housing part to be moved when the pressure in said chamber changes, said pressure-sensitive means being operatively connected to said switch means for automatically operating the same.

11. An arrangement as defined in claim 7 and wherein said moving means is in the form of a piston movably mounted in said second housing part, and a support is connected to and carries said pressure member, said support being slidably mounted on said piston, and resilient means interconnecting said support and piston for movement with respect to each other.

12. An arrangement as defined in claim 11 and wherein said piston is movable toward said first housing part to a predetermined location to place said pressure member in said first position thereof, and releasable lock means operatively connected to said piston for releasably holding the same in said predetermined location.

References Cited in the file of this patent

UNITED STATES PATENTS

| | | |
|---|---|---|
| 1,205,686 | Uhl | Nov. 21, 1916 |
| 1,501,412 | Ingram | July 15, 1924 |
| 2,090,089 | Wiegand | Aug. 17, 1937 |
| 2,146,102 | Wiegand | Feb. 7, 1939 |
| 2,177,042 | Michael | Oct. 24, 1939 |
| 2,452,527 | Peter | Oct. 26, 1948 |
| 2,543,590 | Swank | Feb. 27, 1951 |
| 2,579,048 | Paul | Dec. 18, 1951 |
| 2,633,889 | Vignini | Apr. 7, 1953 |